(12) United States Patent
Tang (10) Patent No.: US 11,025,396 B2
(45) Date of Patent: Jun. 1, 2021

(54) METHOD AND DEVICE FOR TRANSMITTING DATA

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 54 days.

(21) Appl. No.: 16/099,052

(22) PCT Filed: Jul. 18, 2016

(86) PCT No.: PCT/CN2016/090319
§ 371 (c)(1),
(2) Date: Nov. 5, 2018

(87) PCT Pub. No.: WO2018/014162
PCT Pub. Date: Jan. 25, 2018

(65) Prior Publication Data
US 2019/0140804 A1 May 9, 2019

(51) Int. Cl.
*H04L 5/00* (2006.01)
*H04W 72/12* (2009.01)
(Continued)

(52) U.S. Cl.
CPC .......... *H04L 5/0055* (2013.01); *H04L 1/1607* (2013.01); *H04L 1/1685* (2013.01);
(Continued)

(58) Field of Classification Search
CPC ..................... H04L 1/12–20; H04L 5/0055
See application file for complete search history.

(56) References Cited

U.S. PATENT DOCUMENTS

2005/0066255 A1 3/2005 Jiang
2007/0177630 A1 8/2007 Ranta
(Continued)

FOREIGN PATENT DOCUMENTS

CN 102347823 A 2/2012
CN 104601304 A 5/2015
(Continued)

OTHER PUBLICATIONS

"RLC Remaining Issues", 3GPP Draft; R2-162333 RLC Remaining Issues, 3RD Generation Partnership Project(3GPP), Mobile Competence Centre ; 650, Route Des Lucioles ; F-06921 Sophia-Antipolis Cedex ; France, vol. RAN WG2, No. Dubrovnik, Croatia; 20160411-20160415 Apr. 2, 2016 (Apr. 2, 2016), XP051062390, Retrieved from the Internet: URL:http://www.3gpp.org/ftp/tsg_ran/WG2_RL 2/TSGR2_93bis/Docs/ [retrieved on Apr. 2, 2016] * p. 6 *.
(Continued)

*Primary Examiner* — Marcus Smith (57) ABSTRACT

Provided in embodiments of the present invention are a method and device for transmitting data. The method comprises: a first device receives first indication information transmitted by a second device, the first indication information being used for indicating whether the first device is to transmit acknowledgement/negative-acknowledgement (ACK/NACK) feedback information for first data to the second device; and when the first indication information is used for indicating the first device to transmit the ACK/NACK feedback information for the first data to the second device, the first device transmits the ACK/NACK feedback information for the first data to the second device, thus saving signaling overhead and increasing resource utilization rate.

17 Claims, 3 Drawing Sheets

(51) Int. Cl.
  *H04L 1/18* (2006.01)
  *H04L 1/16* (2006.01)

(52) U.S. Cl.
  CPC .............. *H04L 1/18* (2013.01); *H04L 1/1812* (2013.01); *H04L 1/1854* (2013.01); *H04W 72/12* (2013.01)

(56) References Cited

U.S. PATENT DOCUMENTS

| | | |
|---|---|---|
| 2009/0086704 A1 | 4/2009 | Ho |
| 2014/0307676 A1 | 10/2014 | Heo et al. |
| 2015/0009897 A1* | 1/2015 | Wilhelmsson ........ H04L 1/1854 370/328 |
| 2016/0029373 A1 | 1/2016 | Seok |
| 2016/0261391 A1* | 9/2016 | Chen ..................... H04W 76/27 |
| 2016/0270109 A1* | 9/2016 | Jiang ..................... H04L 5/0055 |
| 2016/0353443 A1* | 12/2016 | Desai ..................... H04L 5/0092 |
| 2017/0135116 A1* | 5/2017 | Kuchibhotla ......... H04L 5/0055 |
| 2017/0171841 A1* | 6/2017 | Chen ..................... H04L 1/1854 |
| 2017/0288819 A1* | 10/2017 | Chen ................. H04W 72/0413 |
| 2017/0339690 A1* | 11/2017 | Damnjanovic ... H04W 72/0413 |
| 2017/0373801 A1* | 12/2017 | Bergstrom ............ H04L 1/1896 |
| 2017/0373802 A1 | 12/2017 | Bergstrom et al. |
| 2018/0103485 A1* | 4/2018 | Jiang ................. H04W 72/1289 |
| 2018/0343087 A1 | 11/2018 | Bergstrom et al. |
| 2018/0367285 A1* | 12/2018 | Yi .......................... H04L 1/1812 |
| 2019/0124680 A1* | 4/2019 | Li ............................. H04L 5/14 |

FOREIGN PATENT DOCUMENTS

| | | |
|---|---|---|
| EP | 3414856 A1 | 12/2018 |
| JP | 2011517191 A | 5/2011 |
| JP | 2011146988 A | 7/2011 |
| JP | 2013536599 A | 9/2013 |
| WO | 2006051823 A1 | 5/2006 |
| WO | 2017138853 A1 | 8/2017 |

OTHER PUBLICATIONS

Supplementary European Search Report in the European application No. 16909093.3, dated Feb. 21, 2019.
English Translation of the Written Opinion of the International Search Authority in the international application No. PCT/CN2016/090319, dated Apr. 6, 2017.
International Search Report in international application No. PCT/CN2016/090319, dated Apr. 6, 2017.
Written Opinion of the International Search Authority in international application No. PCT/CN2016/090319, dated Apr. 6, 2017.
First Office Action of European application No. 16909093.3, dated Nov. 29, 2019.
First Office Action on the Japanese application No. 2018-563560, dated Apr. 7, 2020.
ZTE, ZTE Microelectronics, Ericsson, Qualcomm, NTT Docomo, "Way Forward on Ack/Nack feedback of DL HARQ for NR", 3GPP TSG RAN WG1 #85 R1-166032, Nanjing, China, May 23-27, 2016, Agenda item 7.1.4, 4 pages.
"3GPP TS 36.213 V13.2.0 release13" (Jun. 2016), pp. 45-254.
First Office Action of the Indian application No. 201817048648, dated Jul. 27, 2020.
First Office Action of the Chinese application No. 201680084981.X, dated Aug. 11, 2020.
The second examination report with English Translation for Chinese application 201680084981.X dated Nov. 10, 2020.
Decision to Grant a Patent with English Translation for Japanese application 2018-563580 dated Jan. 5, 2021.
The first examination report with English Translation for Taiwan application 106122648 dated Nov. 26, 2020.

* cited by examiner

100

A first device receives first indication information from a second device, the first indication information indicating whether the first device is required to transmit feedback information of first data to the second device — S110

When the first indication information indicates that the first device is required to transmit the feedback information of the first data to the second device, the first device transmits ACK/NACK feedback information of the first data to the second device — S120

A second device transmits first indication information to a first device, the first indication information indicating whether the first device is required to transmit feedback information of first data to the second device — S210

When the first indication information indicates that the first device is required to transmit the feedback information of the first data to the second device, the second device receives ACK/NACK feedback information of the first data from the first device — S220

METHOD AND DEVICE FOR TRANSMITTING DATA

RELATED APPLICATION

This application is an application under 35 U.S.C. 371 of International Application No. PCT/CN2016/090319 filed on Jul. 18, 2016, the entire contents of which are incorporated herein by reference.

TECHNICAL FIELD

The application relates to the field of communication, and more particularly to a method and device for data transmission.

BACKGROUND

In an existing network system, after a second device transmits data, a first device, when receiving the data, has to decode the data and return an Acknowledge/Non-acknowledge (ACK/NACK) according to a decoding result. Then, the second device determines whether Hybrid Automatic Repeat Request (HARQ) retransmission is to be performed. A certain time is required to decode the data and return the ACK/NACK, which may result in a relatively long transmission delay. Moreover, each ACK/NACK feedback occupies a control channel resource. A future network system may make higher requirements on data transmission delay and reliability, particularly for an Ultra-Reliable Low-Latency Communication (URLLC) service. If a terminal device has high transmission reliability (probability of correctly receiving data), providing an ACK/NACK feedback for each data transmission may result in a relatively long transmission delay and increases a signaling overhead.

SUMMARY

Embodiments of the application provide a method and device for data transmission, which may reduce a data transmission delay and reduce a signaling overhead.

A first aspect provides a method for data transmission, which may include that: a first device receives first indication information from a second device, the first indication information indicating whether the first device is required to transmit ACK/NACK feedback information of first data to the second device; and when the first indication information indicates that the first device is required to transmit the ACK/NACK feedback information of the first data to the second device, the first device transmits the ACK/NACK feedback information of the first data to the second device.

In the embodiments of the application, the first device receives the first indication information from the second device, the first indication information indicating whether the first device is required to transmit the ACK/NACK feedback information of the first data. When the first indication information indicates that the first device is not required to transmit the ACK/NACK feedback information of the first data, the first device does not transmit the ACK/NACK feedback information of the first data. When the first indication information indicates that the first device is required to transmit the ACK/NACK feedback information of the first data, the first device transmits the ACK/NACK feedback information of the first data to the second device. The first device may transmit the ACK/NACK feedback information of the first data to the second device according to an indication of the first indication information. For example, the ACK/NACK feedback information may be an ACK/NACK. Therefore, the first device is prevented from keeping transmitting the ACK/NACK feedback information of the first data to the second device, a transmission delay may be reduced, a signaling overhead may be reduced, resource waste may be reduced and a resource utilization rate may be increased.

Alternatively, the first data may be one or more data packets, or the first data may be one or more data blocks.

Alternatively, the first device may be a terminal device and the second device may be a network device; or the first device may be a network device and the second device may be a terminal device; or the first device may be a terminal device and the second device may be a terminal device.

In a first possible implementation of the first aspect, the operation that the first device receives the first indication information from the second device may include that: the first device receives the first indication information carried in a message encapsulated with the first data or in scheduling information of the first data from the second device.

In the embodiments of the application, when the first indication information is carried in the message encapsulated with the first data or in the scheduling information of the first data, the first indication information indicates whether to feed back the ACK/NACK feedback information of the first data. That is, each piece of data carries own first indication information to indicate whether the ACK/NACK feedback information of the first data is required to be fed back. Therefore, the first device may feed back the ACK/NACK feedback information of the first data to the second device according to the first indication information, the signaling overhead may be reduced, and the resource utilization rate may be increased.

Alternatively, the scheduling information of the first data may be control information of the first data. For example, when the first device is a terminal device and the second device is a network device, the scheduling information of the first data may be Downlink Control Information (DCI).

In combination with the abovementioned possible implementation of the first aspect, in a second possible implementation of the first aspect, the operation that the first device receives the first indication information from the second device may include that: the first device receives the first indication information carried in a message encapsulated, with second data or in scheduling information of the second data from the second device.

In the embodiments of the application, when the first indication information is carried in the message encapsulated with the second data or in the scheduling information of the second data, the first indication information indicates whether to feed back the ACK/NACK feedback information of the first data. That is, the second data carries the first indication information of the first data to indicate whether the ACK/NACK feedback information of the first data is required to be fed back. Therefore, the first device may feed back the ACK/NACK feedback information of the first data to the second device according to the first indication information, the signaling overhead may be reduced, and the resource utilization rate may be increased.

Furthermore, when the first data includes multiple data packets or multiple transmission blocks, the second data carries indication information for feedback of ACK/NACK feedbacks corresponding to the multiple data packets or multiple pieces of data. The feedback indication information of the multiple data packets or the multiple transmission blocks may be indicated through the first indication information carried in the second data. Therefore, a resource overhead caused by transmitting ACK/NACK feedback information for each data packet or transmission block may be avoided, and the resource utilization rate is further increased.

In combination with the abovementioned possible implementations of the first aspect, in a third possible implementation of the first aspect, the first data may be N pieces of data received before or after the first device receives the first indication information, N being more than or equal to 1, or the first data may be at least one piece of data received after the first device transmits the ACK/NACK feedback information last time, or the first data may be at least one piece of data received after the first device receives feedback indication information last time, the feedback indication information indicating that the first device is required to transmit ACK/NACK feedback information of third data to the second device.

Alternatively, the first data is at least one piece of data received between ACK/NACK feedback information transmitted by the first device last time and the transmitted ACK/NACK feedback information of the first data. Or, the first data is at least one piece of data received between feedback indication information received by the first device last time and the received first indication information, the feedback indication information indicating that the first device is required to transmit the ACK/NACK feedback information of the third data to the second device.

Specifically, the first data may be N pieces of data closest to the first indication information received by the first device, for example, the first data is N pieces of data received by the first device before or later, and then the first indication information may indicate whether to transmit ACK/NACK feedback information of the N pieces of data. The first data may also be one or more pieces of data received after the ACK/NACK feedback information transmitted by the first device last time, namely most recently. The first data may also be one or more pieces of data received after the feedback indication information received last time, namely most recently, by the first device. Of course, the first data may also be at least one piece of data between the ACK/NACK feedback information required to be transmitted by the first device this time and the ACK/NACK feedback information transmitted last time, or the first data may be at least one piece of data between the first indication information received this time and feedback indication information received most recently. The third data may be data for which whether the ACK/NACK feedback information is required to be transmitted, which is indicated by the feedback indication information.

Furthermore, the first data may not be the N pieces of data received before or after the first device receives the first indication information. For example, a certain time is required to decode the first data. When fourth data before a decoding starting time and decoding ending time of the first data received by the first device may not be included in the first data, that is, reception of the first data and reception of the first indication information is spaced by the fourth data, that is, the first device receives the first indication information, the first indication information indicating the ACK/NACK feedback information of the first data to be fed back, the first device may feed back the ACK/NACK feedback information of the first data. Therefore, a delay caused by waiting for decoding of the first data when the first indication information is received may be avoided.

In combination with the abovementioned possible implementations of the first aspect, in a fourth implementation of the first aspect, before the operation that the first device transmits the ACK/NACK feedback information of the first data to the second device, the method may further include that: the first device determines a resource for transmitting the ACK/NACK feedback information according to a resource occupied by the second data or the scheduling information of the second data, the operation that the first device transmits the ACK/NACK feedback information of the first data to the second device may include that: the first device transmits the ACK/NACK feedback information of the first data to the second device on the resource for the ACK/NACK feedback information.

In the embodiments of the application, the resource for transmitting the ACK/NACK feedback information of the first data may be determined according to the resource occupied by the second data or the scheduling information of the second data. For example, a subframe for transmitting the ACK/NACK feedback information of the first data may be determined according to a subframe occupied by the second data or the scheduling information of the second data. For another example, an uplink control channel resource for transmitting the ACK/NACK feedback information of the first data may be confirmed according to an index of a first Control Channel Element (CCE) occupied by the scheduling information of the second data, or the uplink control channel resource for the ACK/NACK feedback information of the first data may be determined according to a first Physical Resource Block (PRB) occupied by the first data. An uplink control channel may be a Physical Uplink Control Channel (PUCCH) and the scheduling information of the second data may be DCI configured to schedule the second data.

In combination with the abovementioned possible implementations of the first aspect, in a fifth implementation of the first aspect, the first indication information may further include information of the resource for transmitting the ACK/NACK feedback information of the first data, the operation that the first device transmits the ACK/NACK feedback information of the first data to the second device may include that: the first device determines the resource for transmitting the ACK/NACK feedback information according to the information of the resource for transmitting the ACK/NACK feedback information of the first data; and the first device transmits the ACK/NACK feedback information to the second device on the resource for the ACK/NACK feedback information.

In the embodiments of the application, the resource for transmitting the ACK/NACK feedback information of the first data may be determined according to the resource occupied by the second data or the scheduling information of the second data, and the first indication information may also include the information of the resource for transmitting the ACK/NACK feedback information of the first data. For example, the information of the resource may be a resource index or a resource offset. Therefore, the first device, when receiving the first indication information, may determine the information of the resource for transmitting the ACK/NACK feedback information of the first data according to the first indication information. For example, the resource may be an uplink control channel resource for transmitting the ACK/NACK feedback information. The uplink control channel may typically be a PUCCH.

In combination with the abovementioned possible implementations of the first aspect, in a sixth implementation of the first aspect, the first indication information may include HARQ timing information, and the HARQ timing information may be configured to indicate time interval information between a time when the first device receives the first indication information and a time when the first device transmits the ACK/NACK feedback information, the operation that the first device transmits the ACK/NACK feedback information of the first data to the second device may include that: the first device transmits the ACK/NACK feedback information of the first data to the second device according to the HARQ timing information.

In combination with the abovementioned possible implementations of the first aspect, in a seventh implementation of the first aspect, the operation that the first device transmits the ACK/NACK feedback information of the first data to the second device may include that: when the first device correctly decodes all data blocks in the first data, the first device transmits ACK information of the first data to the second device; and when the first device incorrectly decodes at least one data block in the first data, the first device transmits NACK information of the first data to the second device.

A second aspect provides a method for data transmission, which may include that: a second device transmits first indication information to a first device, the first indication information indicating whether the first device is required to transmit ACK/NACK feedback information of first data to the second device; and when the first indication information indicates that the first device is required to transmit the ACK/NACK feedback information of the first data to the second device, the second device receives the ACK/NACK feedback information of the first data from the first device.

In a first possible Implementation of the second aspect, the operation that the second device transmits the first indication information to the first device may include that: the second device transmits the first indication information to the first device through a message encapsulated with the first data or through scheduling information of the first data.

In combination with the abovementioned possible implementation of the second aspect, in a second implementation of the second aspect, the operation that the second device transmits the first indication information to the first device may include that: the second device transmits the first indication information to the first device through a message encapsulated with second data or through scheduling information of the second data.

In combination with the abovementioned possible implementations of the second aspect, in a third implementation of the second aspect, the first data may be N pieces of data transmitted before or after the second device transmits the first indication information, N being more than or equal to 1, or the first data may be at least one piece of data transmitted after the second device receives the ACK/NACK feedback information last time; or the first data may be at least one piece of data transmitted after the second device transmits feedback indication information last time, the feedback indication information indicating that the first device is required to transmit ACK/NACK feedback information of third data to the second device.

Alternatively, the first data is at least one piece of data transmitted between ACK/NACK feedback information received by the second device last time and the received ACK/NACK feedback information of the first data. Or, the first data is at least one piece of data transmitted between feedback indication information transmitted by the second device last time and the transmitted first indication information, the feedback indication information indicating that the first device is required to transmit the ACK/NACK feedback information of third data to the second device.

In combination with the abovementioned possible implementations of the second aspect, in a fourth implementation of the second aspect, the operation that the second device receives the ACK/NACK feedback information of the first data from the first device may include that: the second device receives the ACK/NACK feedback information of the first data from the first device on a resource for transmitting the ACK/NACK feedback information, the resource for transmitting the ACK/NACK feedback information being determined according to a resource occupied by the second data or the scheduling information of the second data.

In combination with the abovementioned possible implementations of the second aspect, in a fifth implementation of the second aspect, the first indication information may further include information of the resource for transmitting the ACK/NACK feedback information of the first data, the operation that the second device receives the ACK/NACK feedback information of the first data from the first device may include that: the second device receives the ACK/NACK feedback information of the first data from the first device according to the information of the resource for the ACK/NACK feedback information of the first data.

In combination with the abovementioned possible implementations of the second aspect, in a sixth implementation of the second aspect, the first indication information may include HARQ timing information and the HARQ timing information may be configured to indicate time interval information between a time when the first device receives the first indication information and a time when the first device transmits the ACK/NACK feedback information, the operation that the second device receives the ACK/NACK feedback information of the first data from the first device may include that: the second device receives the ACK/NACK feedback information of the first data from the first device according to the HARQ timing information.

In combination with the abovementioned possible implementations of the second aspect, in a seventh implementation of the second aspect, the operation that the second device receives the ACK/NACK feedback information of the first data from the first device may include that: when the first device correctly decodes all data blocks in the first data, the second device receives ACK information of the first data from the first device; and when the first device incorrectly decodes at least one data block in the first data, the second device receives NACK information of the first data from the first device.

A third aspect provides a device for data transmission, which is configured to execute the method in the first aspect or any possible implementation of the first aspect. Specifically, the device includes units configured to execute the method in the first aspect or any possible implementation of the first aspect.

A fourth aspect provides a device for data transmission, which is configured to execute the method in the second aspect or any possible implementation of the second aspect. Specifically, the device includes units configured to execute the method in the second aspect or any possible implementation of the second aspect.

A fifth aspect provides a system for data transmission, which includes the device of the third aspect and the device of the fourth aspect.

A sixth aspect provides a device for data transmission, which includes a receiver, a transmitter, a memory, a processor and a bus system. The receiver, the transmitter, the memory and the processor are connected through the bus system, the memory is configured to store instructions, the processor is configured to execute the instructions stored in the memory to control the receiver to receive signals and control the transmitter to transmit signals, and when the processor executes the instructions stored in the memory, such execution enables the processor to execute the method in the first aspect or any possible implementation of the first aspect.

A seventh aspect provides a device for data transmission, which includes a receiver, a transmitter, a memory, a processor and a bus system. The receiver, the transmitter, the memory and the processor are connected through the bus system, the memory is configured to store instructions, the processor is configured to execute the instructions stored in the memory to control the receiver to receive signals and control the transmitter to transmit signals, and when the processor executes the instructions stored in the memory, such execution enables the processor to execute the method in the second aspect or any possible implementation of the second aspect.

An eighth aspect provides a computer-readable medium, which is configured to store a computer program, the computer program including instructions configured to execute the method in the first aspect or any possible implementation of the first aspect.

A ninth aspect provides a computer-readable medium, which is configured to store a computer program, the computer program including instructions configured to execute the method in the second aspect or any possible implementation of the second aspect.

BRIEF DESCRIPTION OF DRAWINGS

In order to describe the technical solutions of the embodiments of the application more clearly, the drawings required to be used in descriptions about the embodiments or a conventional art will be simply introduced below. It is apparent that the drawings described below are only some embodiments of the application. Other drawings may further be obtained by those of ordinary skill in the art according to these drawings without creative work.

DETAILED DESCRIPTION

The technical solutions in the embodiments of the application will be clearly and completely described below in combination with the drawings in the embodiments of the application. It is apparent that the described embodiments are not all embodiments but part of embodiments of the application. All other embodiments obtained by those of ordinary skill in the art on the basis of the embodiments in the application without creative work shall fall within the scope of protection of the application.

It is to be understood that the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a communication system which may emerge in the future.

It is also to be understood that, in the embodiments of the application, a terminal device may be called User Equipment (UE), a terminal device, a Mobile Station (MS), a mobile terminal, a terminal device in a future 5th-Generation (5G) network or the like. The terminal device may communicate with one or more core networks through a Radio Access Memory (RAN). For example, a terminal may be a mobile phone (or called a "cellular" phone) and a computer with a mobile terminal. For example, the terminal may also be a portable, pocket, handheld, computer-embedded or vehicle-mounted mobile device and performs voice and/or data exchange with the RAN.

In the embodiments of the application, a network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like.

Figure 1:
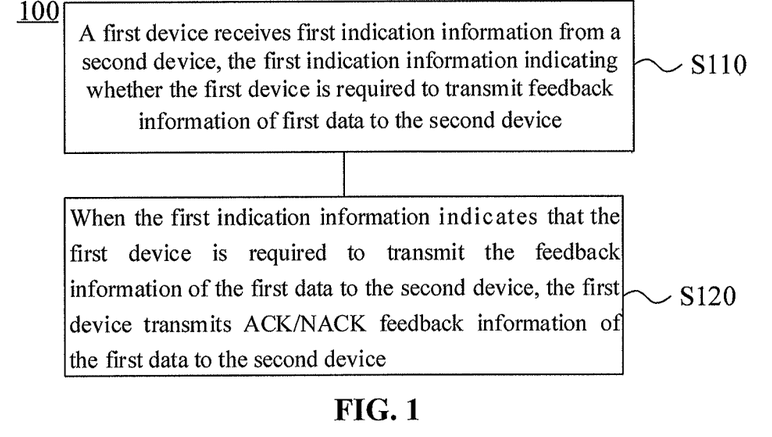
FIG. 1 illustrates a schematic diagram of a method for data transmission according to an embodiment of the application.

FIG. 1 illustrates a schematic flowchart of a method for data transmission 100 according to another embodiment of the application. It is to be understood that FIG. 1 shows actions or operations of the method for data transmission. However, these actions or operations are only examples. Other operations or transformations of each operation in FIG. 1 may also be executed in the embodiment of the application. The method 100 includes the following actions.

In S110, a first device receives first indication information from a second device, the first indication information indicating whether the first device is required to transmit ACK/NACK feedback information of first data to the second device.

In S120, when the first indication information indicates that the first device is required to transmit the ACK/NACK feedback information of the first data to the second device, the first device transmits the ACK/NACK feedback information of the first data to the second device.

Figure 2:
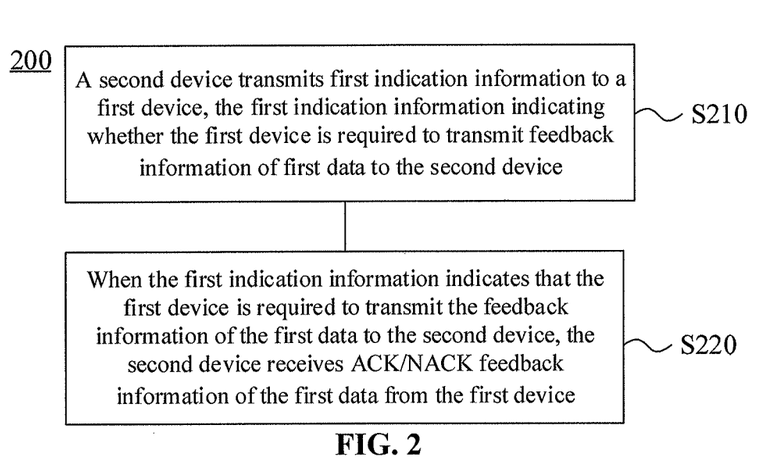
FIG. 2 illustrates another schematic diagram of a method for data transmission according to an embodiment of the application.

FIG. 2 illustrates a schematic flowchart of a method for data transmission 200 according to an embodiment of the application. It is to be understood that FIG. 2 shows actions or operations of the method for data transmission. However, these actions or operations are only examples. Other operations or transformations of each operation in FIG. 2 may also be executed in the embodiment of the application. The method 200 includes the following actions.

In S210, a second device transmits first indication information to a first device, the first indication information indicating whether the first device is required to transmit ACK/NACK feedback information of first data to the second device.

In S220, when the first indication information indicates that the first device is required to transmit the ACK/NACK feedback information of the first data to the second device, the second device receives the ACK/NACK feedback information of the first data from the first device.

It is to be understood that the first device may be a terminal device and the second device may be a network device; or the first device may be a network device and the second device may be a terminal device; or the first device may be a terminal device and the second device may be a terminal device; or the first device may be a network device and the second device may be a network device. The embodiment of the application is not limited thereto.

It is also to be understood that the first data may be one or more data packets or the first data may be one or more data blocks. The embodiment of the application is not limited thereto.

Specifically, the second device transmits the first indication information to the first device, the first indication information indicating whether the first device is required to transmit the ACK/NACK feedback information of the first data to the second device. For example, the ACK/NACK feedback information may be an ACK or a NACK. When the first device receives the first indication information and if the first indication information indicates that the first device is not required to transmit the ACK/NACK feedback information of the first data to the second device, the first device does not transmit the ACK/NACK feedback information of the first data. If the first indication information indicates that the first device is required to transmit the ACK/NACK feedback information of the first data to the second device, the first device transmits the ACK/NACK feedback information of the first data to the second device. The first device may transmit the ACK/NACK feedback information of the first data to the second device according to the first indication information, so that the first device is prevented from keeping transmitting the ACK/NACK feedback information of the first data to the second device, a signaling overhead may be reduced, resource waste may be avoided and a resource utilization rate may be increased.

It is to be understood that the first indication information may be a special bit specified by a protocol. For example, when a value of the bit is 1, it indicates that the first device is required to transmit the ACK/NACK information of the first data to the second device. When the value of the bit is 0, it indicates that the first device is not required to transmit the ACK/NACK feedback information of the first data to the second device. A specific indication manner may be configured through a network and may also adopt an indication manner specified by the protocol. The embodiment of the application is not limited thereto.

It is also understood that the first indication information may be directly transmitted to the first device by the second device, or the first indication information may be carried in another message for transmitting to the first device, the first indication information may be transmitted through a control channel or may be transmitted through a data channel, or the first indication information may be born in user-plane data for transmitting or may be born in control-plane data for transmitting. The embodiment of the application is not limited thereto.

As an alternative embodiment, S210 includes that: the second device transmits the first indication information to the first device through a message encapsulated with the first data or through scheduling information of the first data. S110 includes that: the first device receives the first indication information carried in the message encapsulated with the first data or in the scheduling information of the first data from the second device.

Specifically, when the first indication information is carried in the message encapsulated with the first data or in the scheduling information of the first data, the first indication information indicates whether to feed back the ACK/NACK feedback information of the first data. That is, each piece of data carries its own first indication information to indicate whether the ACK/NACK feedback information of the first data is required to be fed back. Therefore, the first device may feed back the ACK/NACK feedback information of the first data to the second device according to the first indication information, the signaling overhead may be reduced, and the resource utilization rate may be increased.

As an example, the second device transmits 50 data packets to the first device. Each data packet in the 50 data packets may carry its own first indication information to indicate whether to feed back own ACK/NACK feedback information. When the first device receives the 50 data packets, whether to feed back the ACK/NACK feedback information of each data packet is determined according to the first indication information of each data packet in the 50 data packets.

Furthermore, when the first device is a terminal device and the second device is a network device, the second device may carry the first indication information in the message encapsulated with the first data for transmitting to the first device, or the second device may transmit the first indication information through DCI scheduling the first data. The embodiment of the application is not limited thereto.

As an alternative embodiment, S210 includes that: the second device transmits the first indication information to the first device through a message encapsulated with second data or through scheduling information of the second data. S110 includes that: the first device receives the first indication information carried in the message encapsulated with the second data or in the scheduling information of the second data from the second device.

It is to be understood that the scheduling information of the second data may be DCI of the second data.

Specifically, when the first indication information is carried in the message encapsulated with the second data or in the scheduling information of the second data, the first indication information indicates whether to feed back the ACK/NACK feedback information of the first data. That is, the second data carries the first indication information of the first data to indicate whether the ACK/NACK feedback information of the first data is required to be fed back. Therefore, the first device may feed back the ACK/NACK feedback information of the first data to the second device according to the first indication information, the signaling overhead may be reduced, and the resource utilization rate may be increased.

Furthermore, when the first data includes multiple data packets or multiple transmission blocks, the second data carries indication information for feedback of ACK/NACK feedbacks corresponding to the multiple data packets or multiple pieces of data. The feedback indication information of the multiple data packets or the multiple transmission blocks may be indicated through the first indication information carried in the second data. Therefore, a resource overhead caused by transmitting ACK/NACK feedback information for each data packet or transmission block may be avoided, and the resource utilization rate is further increased.

As an example, the second device transmits 9 data packets to the first device, each data packet in the 9 data packets carrying first indication information and the first indication information carried in each data packet indicating whether to feed back ACK/NACK feedback information of the 8 data packets closest to the data packet. If the first indication information in the first data packet to the eighth data packet indicates that it is not required to transmit the ACK/NACK feedback information and the first indication information in the ninth data packet indicates that it is required to transmit the ACK/NACK feedback information, namely transmitting the ACK/NACK feedback information of the first 8 data packets, when the first 8 data packets are correctly decoded, the first device transmits ACK information to the second device, and when the first 8 data packets are incorrectly decoded, that is, at least one is incorrectly decoded, the first device transmits NACK information to the second device. Therefore, the ACK/NACK feedback information of the 8 data packets may be fed back to the second device at one time, the ACK/NACK feedback time information is prevented from being fed back for eight times, the signaling overhead is further reduced, and the resource utilization rate is increased.

As another example, the second device transmits 9 data packets to the first device, the 9 data packets carrying no first indication information. The second device transmits the first indication information to the first device. It is specified by the protocol or configured through the network that the first indication information indicates ACK/NACK feedback information of the 9 data packets to be fed back. When the 9 data packets are correctly decoded, the first device transmits ACK information to the second device, and when the 9 data packets are incorrectly decoded, that is, at least one is incorrectly decoded, the first device transmits NACK information to the second device. Therefore, the ACK/NACK feedback information of the 9 data packets may be fed back to the second device at one time, the ACK/NACK feedback time information is prevented from being fed back for eight times, the signaling overhead is further reduced, and the resource utilization rate is increased.

As an alternative embodiment, the first data is N pieces of data transmitted before or after the first device receives the first indication information, N being more than or equal to 1, the first data is at least one piece of data received after the first device transmits the ACK/NACK feedback information last time, or the first data is at least one piece of data received after the first device receives feedback indication information last time, the feedback indication information indicating that the first device is required to transmit ACK/NACK feedback information of third data to the second device.

Alternatively, the first data is at least one piece of data received between ACK/NACK feedback information transmitted by the first device last time and the transmitted ACK/NACK feedback information of the first data. Or, the first data is at least one piece of data received between feedback indication information received by the first device last time and the received first indication information, the feedback indication information indicating that the first device is required to transmit the ACK/NACK feedback information of the third data to the second device.

Specifically, the first data may be N pieces of data closest to the first indication information received by the first device, for example, the first data is N pieces of data received by the first device before or later, and then the first indication information may indicate whether to transmit ACK/NACK feedback information of the N pieces of data. The first data may also be one or more pieces of data received after the ACK/NACK feedback information transmitted by the first device last time, namely last time. The first data may also be one or more pieces of data received after the feedback indication information received last time, namely last time, by the first device. Of course, the first data may also be at least one piece of data between the ACK/NACK feedback information required to be transmitted by the first device this time and the ACK/NACK feedback information transmitted last time, or the first data may also be at least one piece of data between the first indication information received this time and feedback indication information received last time. The third data may be data for which whether the ACK/NACK feedback information is required to be transmitted, which is indicated by the feedback indication information.

Furthermore, the first data may not be the N pieces of data received before or after the first device receives the first indication information. For example, a certain time is required to decode the first data. When fourth data before a decoding starting time and decoding ending time of the first data received by the first device may not be included in the first data, that is, reception of the first data and reception of the first indication information is spaced by the fourth data, that is, the first device receives the first indication information, the first indication information indicating the ACK/NACK feedback information of the first data to be fed back, the first device may feed back the ACK/NACK feedback information of the first data. Therefore, a delay caused by waiting for decoding of the first data when the first indication information is received may be avoided.

As an example, when the second device transmits 20 data packets to the first device, the second device may transmit the first indication information to the first device through the 20th data packet or scheduling information of the 20th data packet. Since a certain time is required to decode a data packet, for example, a time probably required to decode 18 data packets is a transmitting time for two data packets, it is specified by the protocol or configured through the network that the first indication information indicates ACK/NACK feedback information of the first 18 data packets to be fed back. In such a manner, when the first indication information carried in the 20th data packet or the first indication information carried in the scheduling information of the 20th data packet is received, the first 18 data packets are completely decoded. When the 18 data packets are correctly decoded, the first device transmits ACK information to the second device, and when the 18 data packets are incorrectly decoded, that is, at least one is incorrectly decoded, the first device transmits NACK information to the second device. Therefore, a time interval between reception of the first indication information and transmitting the ACK/NACK feedback information may be avoided, a data transmission time may further be reduced, and system performance may be improved.

It is to be understood that the first data may be data specified by the network protocol or may be data configured through the network. The embodiment of the application is not limited thereto.

As an alternative embodiment, the first data is N pieces of data transmitted before or after the second device transmits the first indication information, N being more than or equal to 1, the first data is at least one piece of data transmitted after the second device receives the ACK/NACK feedback information last time, or the first data is at least one piece of data transmitted after the second device transmits feedback indication information last time, the feedback indication information indicating that the first device is required to transmit the ACK/NACK feedback information of the third data to the second device.

As an alternative embodiment, before S120, the method 100 further includes that: the first device determines a resource for transmitting the ACK/NACK feedback information according to a resource occupied by the second data or the scheduling information of the second data. S120 includes that: the first device transmits the ACK/NACK feedback information of the first data to the second device on the resource for the ACK/NACK feedback information. S220 includes that: the second device receives the ACK/NACK feedback information of the first data from the first device on the resource determined according to the resource occupied by the second data or the scheduling information of the second data to transmit the ACK/NACK feedback information.

Specifically, the resource for transmitting the ACK/NACK feedback information of the first data may be determined according to the resource occupied by the second data or the scheduling information of the second data. For example, a subframe transmitting the ACK/NACK feedback information of the first data may be determined according to a subframe occupied by the second data or the scheduling information of the second data. For another example, an uplink control channel resource transmitting the ACK/NACK feedback information of the first data may be confirmed according to an index of a first Control Channel Element (CCE) occupied by the scheduling information of the second data, or the uplink control channel resource for the ACK/NACK feedback information of the first data may be determined according to a first Physical Resource Block (PRB) occupied by the first data. An uplink control channel may be a Physical Uplink Control Channel (PUCCH) and the scheduling information of the second data may be DCI configured to schedule the second data.

As an alternative embodiment, the first indication information further includes information of the resource for transmitting the ACK/NACK feedback information of the first data. S120 includes that: the first device determines the resource for transmitting the ACK/NACK feedback information according to the information of the resource for transmitting the ACK/NACK feedback information of the first data; and the first device transmits the ACK/NACK feedback information to the second device on the resource for the ACK/NACK feedback information. S220 includes that: the second device receives the ACK/NACK feedback information of the first data from the first device according to the information of the resource for the ACK/NACK feedback information of the first data.

Specifically, the resource for transmitting the ACK/NACK feedback information of the first data may be determined according to the resource occupied by the second data or the scheduling information of the second data, and the first indication information may also include the information of the resource for transmitting the ACK/NACK feedback information of the first data. For example, the information of the resource may be a resource index or a resource offset. Therefore, the first device, when receiving the first indication information, may determine the resource transmitting the ACK/NACK feedback information of the first data according to the information of the resource for the ACK/NACK feedback information. For example, the resource may be an uplink control channel resource transmitting the ACK/NACK feedback information. The uplink control channel may typically be a PUCCH.

As an alternative embodiment, the first indication information includes HARQ timing information and the HARQ timing information indicates time interval information between a time when the first device receives the first indication information and a time when the first device transmits the ACK/NACK feedback information. S120 includes that: the first device transmits the ACK/NACK feedback information of the first data to the second device according to the HARQ timing information. S220 includes that: the second device receives the ACK/NACK feedback information of the first data from the first device according to the HARQ timing information.

Specifically, a transmitting time of the ACK/NACK feedback information of the first data is indicated through the HARQ timing information in the first indication information. For example, the HARQ timing information may be an offset between a transmission time unit where the first indication information is received and a transmission time unit where the first device transmits the ACK/NACK feedback information. The transmission time unit is a basic time-domain unit for signal transmission. For example, the transmission time unit may be a radio frame, a subframe, a Transmission Time Interval (TTI), an Orthogonal Frequency Division Multiplexing (OFDM) symbol or another time-domain unit newly defined in 5G. Therefore, the first device may transmit the ACK/NACK feedback information of the first data in the determined transmission time unit.

As an alternative embodiment, S120 includes that: when the first device correctly decodes all data blocks in the first data, the first device transmits ACK information of the first data to the second device; and when the first device incorrectly decodes at least one data block in the first data, the first device transmits NACK information of the first data to the second device. S220 includes that: when the first device correctly decodes all data blocks in the first data, the second device receives ACK information of the first data from the first device; and when the first device incorrectly decodes at least one data block in the first data, the second device receives NACK information of the first data from the first device.

Specifically, when the first data includes one or more data blocks or data packets and the first device correctly decodes one or more data blocks in the first data, the first device transmits the ACK information to the second device. When the first device incorrectly decodes one data block in the first data, or when the first device incorrectly decodes at least part of data blocks in all the data blocks in the first data, the first device transmits the NACK information to the second device.

It is to be understood that the operation that the first device transmits the ACK/NACK information to the second device may be implemented as follows. When multiple data packets are all correctly decoded, ACK information of the multiple data packets is fed back, and when one of the multiple data packets is incorrectly decoded, NACK information of the multiple data packets is returned. Or, a decoding rate may also be preset, the decoding rate may be a ratio of the number of correctly decoded data packets to the number of all the data packets in the first data, for example, when the decoding rate is higher than a set threshold value, the first device transmits the ACK information to the second device, and when the decoding rate is less than or equal to the set threshold value, the first device transmits the NACK information to the second device. The embodiment of the application is not limited thereto.

Alternatively, when the first device is a terminal device and the second device is a network device, as a preferred embodiment, the data may be transmitted through the following actions.

In 1, the network device transmits DCI 1, DCI 2, ... DCI N to the terminal device and a data transmission block 1 ... data transmission block N respectively scheduled by the DCI. Each piece of DCI includes 1-bit ACK/NACK feedback indication information configured to indicate whether the terminal device is required to feed back an ACK/NACK. Meanwhile, each piece of DCI may further include HARQ timing information configured to indicate a subframe offset between each piece of DCI and the transmitted ACK/NACK feedback.

It is to be understood that Step 1 is not limited to the subframe offset and a frame offset, an OFDM offset, a future transmission time unit and the like may also be involved. The HARQ timing information is not limited to an offset and may also be time index information and the like.

In 2, the terminal device detects the DCI 1, DCI 2, ..., DCI N−1 transmitted by the network device and the data transmission blocks scheduled by the DCI and determines that the ACK/NACK is not required to be fed back according to the ACK/NACK feedback indication information in each piece of DCI.

In 3, the terminal device detects the DCI N transmitted by the network device and the data transmission block scheduled by the DCI and determines that the ACK/NACK is required to be fed back according to the ACK/NACK feedback indication information in the DCI N.

Alternatively, in Step 3, a resource for feeding back the ACK/NACK is determined according to a CCE index of the DCI N. Or the resource for feeding back the ACK/NACK and the like may be determined according to an index of a first PRB of the data block N. The embodiment of the application is not limited thereto.

In 4, the ACK/NACK feedback indication information in the DCI N may include HARQ timing information, and the terminal device determines an offset between a subframe transmitting the DCI N and a subframe transmitting the ACK/NACK according to the HARQ timing information in the DCI N, thereby determining a subframe feeding back the ACK/NACK.

In 5, the terminal device feeds back the ACK/NACK to the network device on the determined subframe according to a detection result of the data transmission block 1 ... data transmission block N. If all of the N data transmission blocks are correctly detected, the ACK is fed back, otherwise the NACK is fed back.

Alternatively, the ACK/NACK feedback indication information in the DCI N may include information of the resource for transmitting the ACK/NACK. The terminal device may transmit the ACK/NACK according to the information of the resource for transmitting the ACK/NACK in the ACK/NACK feedback indication information.

Alternatively, when the first device is a terminal device and the second device is a network device, as another preferred example, the data may be transmitted through the following actions.

In 1, the network device transmits DCI and a data transmission block scheduled by the DCI to the terminal device. The DCI includes 1-bit ACK/NACK feedback indication information configured to indicate whether the terminal device is required to feed back an ACK/NACK of the data transmission block. Meanwhile, the DCI further includes PUCCH resource indication information, the PUCCH resource indication information indicating an index of a PUCCH resource for the ACK/NACK.

In 2, the terminal device detects the DCI transmitted by the network device and the data transmission block scheduled by the DCI and determines that the ACK/NACK is required to be fed back according to the ACK/NACK feedback indication information in the DCI.

In 3, the terminal device determines the PUCCH resource for feeding back the ACK/NACK according to the PUCCH resource indication information in the DCI.

Alternatively, the ACK/NACK feedback indication information in the DCI may include information of the resource for transmitting the ACK/NACK. The terminal device may transmit the ACK/NACK according to the information of the resource for transmitting the ACK/NACK in the ACK/NACK feedback indication information.

In 4, the terminal device feeds back the ACK/NACK to the network device on the PUCCH resource according to a detection result of the data transmission block. If the data transmission block is correctly detected, the ACK is fed back, otherwise the NACK is fed back.

Figure 3:
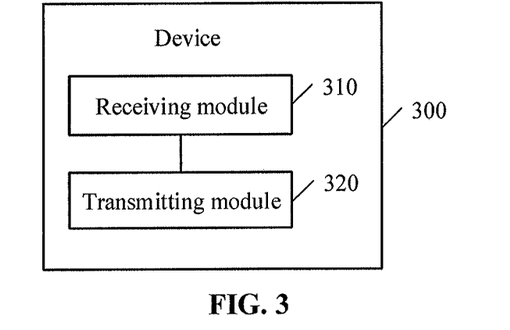
FIG. 3 illustrates a schematic block diagram of a device for data transmission according to an embodiment of the application.

FIG. 3 illustrates a schematic diagram of a device for data transmission 300 according to an embodiment of the application. The device 300 includes a receiving module 310 and a transmitting module 320.

The receiving module 310 is configured to receive first indication information from a second device, the first indication information indicating whether the device is required to transmit ACK/NACK feedback information of first data to the second device.

The transmitting module 320 is configured to, when the first indication information indicates that the device is required to transmit the ACK/NACK feedback information of the first data to the second device, transmit the ACK/NACK feedback information of the first data to the second device.

As an alternative embodiment, the receiving module 310 is specifically configured to receive the first indication information carried in a message encapsulated with the first data or scheduling information of the first data from the second device.

As an alternative embodiment, the receiving module 310 is further specifically configured to receive the first indication information carried in a message encapsulated with second data or scheduling information of the second data from the second device.

As an alternative embodiment, the first data is N pieces of data received before or after the device 300 receives the first indication information, N being more than or equal to 1.

Or, the first data is at least one piece of data received after the device 300 transmits the ACK/NACK feedback information last time.

Or, the first data is at least one piece of data received after the device 300 receives feedback indication information last time, the feedback indication information indicating that the device 300 is required to transmit ACK/NACK feedback information of third data to the second device.

As an alternative embodiment, the device 300 further includes a first determination module, configured to, before the ACK/NACK feedback information of the first data is transmitted to the second data, determine a resource for transmitting the ACK/NACK feedback information according to a resource occupied by the second data or the scheduling information of the second data. The transmitting module 320 is specifically configured to transmit the ACK/

NACK feedback information of the first data to the second device on the resource for the ACK/NACK feedback information.

As an alternative embodiment, the first indication information further includes information of the resource for transmitting the ACK/NACK feedback information of the first data. The device 300 further includes a second determination module, configured to determine the resource for transmitting the ACK/NACK feedback information according to the information of the resource for transmitting the ACK/NACK feedback information of the first data. The transmitting module 320 is further specifically configured to transmit the ACK/NACK feedback information to the second device on the resource for the ACK/NACK feedback information.

As an alternative embodiment, the first indication information includes HARQ timing information and the HARQ timing information indicates time interval information between a time when the device receives the first indication information and a time when the device 300 transmits the ACK/NACK feedback information. The transmitting module 320 is further specifically configured to transmit the ACK/NACK feedback information of the first data to the second device according to the HARQ timing information.

As an alternative embodiment, the transmitting module 320 is specifically configured to, if the device 300 correctly decodes all data blocks in the first data, transmit ACK information of the first data to the second device and, if the device incorrectly decodes at least one data block in the first data, transmit NACK information of the first data to the second device.

It is to be understood that the device 300 described herein is embodied in form of functional module. Term "module" mentioned herein may refer to an Application Specific Integrated Circuit (ASIC), an electronic circuit, a processor (for example, a shared processor, a dedicated processor or a group processor) and memory configured to execute one or more software or firmware programs, a merged logic circuit and/or another proper component supporting the described functions. In an alternative example, those skilled in the art may know that the device 300 may specifically be the first device in the abovementioned embodiments and the device 300 may be configured to execute each flow and/or step corresponding to the first device in the abovementioned method embodiments, which will not be elaborated herein for avoiding repetitions.

Figure 4:
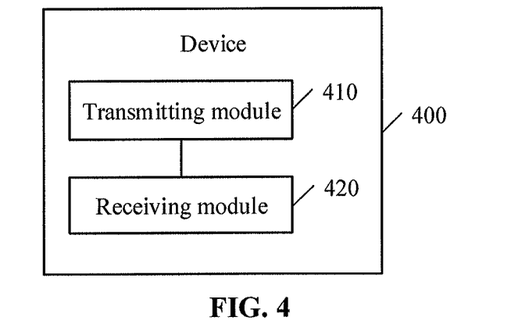
FIG. 4 illustrates another schematic block diagram of a device for data transmission according to an embodiment of the application.

FIG. 4 illustrates a schematic diagram of a device for data transmission 400 according to an embodiment of the application. The device 400 includes a transmitting module 410 and a receiving module 420.

The transmitting module 410 is configured to transmit first indication information to a first device, the first indication information indicating whether the first device is required to transmit ACK/NACK feedback information of first data to the device.

The receiving module 420 is configured to, when the first indication information indicates that the first device is required to transmit the ACK/NACK feedback information of the first data to the device, receive the ACK/NACK feedback information of the first data from the first device.

As an alternative embodiment, the transmitting module 410 is specifically configured to transmit the first indication information to the first device through a message encapsulated with the first data or scheduling information of the first data.

As an alternative embodiment, the transmitting module 410 is specifically configured to transmit the first indication information to the first device through a message encapsulated with second data or scheduling information of the second data.

As an alternative embodiment, the first data is N pieces of data transmitted before or after the device 400 transmits the second data, N being more than or equal to 1.

Or, the first data is at least one piece of data transmitted after the device 400 receives the ACK/NACK feedback information last time.

Or, the first data is at least one piece of data transmitted after the device 400 transmits feedback indication information last time, the feedback indication information indicating that the first device is required to transmit ACK/NACK feedback information of third data to the device 400.

As an alternative embodiment, the receiving module 410 is specifically configured to receive the ACK/NACK feedback information of the first data from the first device on a resource for transmitting the ACK/NACK feedback information, the resource for transmitting the ACK/NACK feedback information being determined according to a resource occupied by the second data or the scheduling information of the second data.

As an alternative embodiment, the first indication information further includes information of the resource for transmitting the ACK/NACK feedback information of the first data. The receiving module 410 is further specifically configured to receive the ACK/NACK feedback information of the first data from the first device according to the information of the resource for transmitting the ACK/NACK feedback information of the first data.

As an alternative embodiment, the first indication information includes HARQ timing information and the HARQ timing information indicates time interval information between a time when the first device receives the first indication information and a time when the first device transmits the ACK/NACK feedback information. The receiving module 410 is further specifically configured to receive the ACK/NACK feedback information of the first data from the first device according to the HARQ timing information.

As an alternative embodiment, the receiving module 410 is further specifically configured to, if the first device correctly decodes all data blocks in the first data, receive, by the device 400, ACK information of the first data from the first device and, if the first device incorrectly decodes at least one data block in the first data, receive, by the device 400, NACK information of the first data from the first device.

It is to be understood that the device 400 described herein is embodied in form of functional module. Term "module" mentioned herein may refer to an ASIC, an electronic circuit, a processor (for example, a shared processor, a dedicated processor or a group processor) and memory configured to execute one or more software or firmware programs, a merged logic circuit and/or another proper component supporting the described functions. In an alternative example, those skilled in the art may know that the device 400 may specifically be the second device in the abovementioned embodiments and the device 400 may be configured to execute each flow and/or step corresponding to the second device in the abovementioned method embodiments, which will not be elaborated herein for avoiding repetitions.

Figure 5:
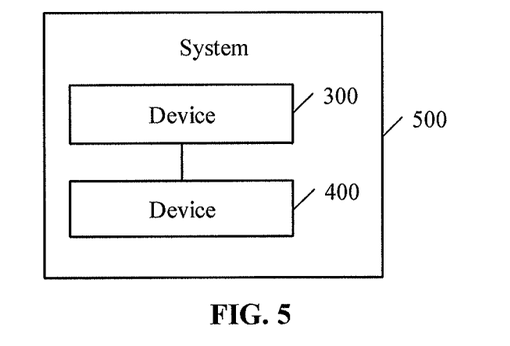
FIG. 5 illustrates a schematic block diagram of a system for data transmission according to an embodiment of the application.

FIG. 5 illustrates a schematic structure diagram of a system for data transmission 500 according to an embodiment of the application. The communication system 500 includes a device 300 and a device 400.

Figure 6:
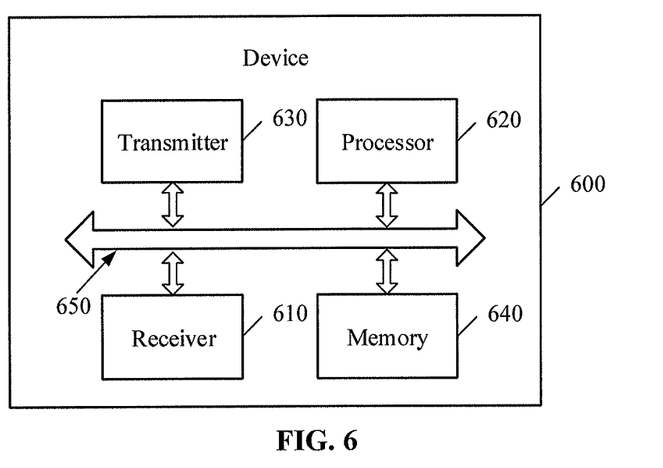
FIG. 6 illustrates a schematic block diagram of a device for data transmission according to an embodiment of the application.

FIG. 6 illustrates a device for data transmission 600 according to an embodiment of the application. The device 600 includes a receiver 610, a processor 620, a transmitter 630, a memory 640 and a bus system 650. The receiver 610, the processor 620, the transmitter 630 and the memory 640 are connected through the bus system 650. The memory 640 is configured to store instructions. The processor 620 is configured to execute the instructions stored in the memory 640 to control the receiver 610 to receive a signal and control the transmitter 630 to transmit instructions.

The receiver 610 is configured to receive first indication information from a second device, the first indication information indicating whether the device 600 is required to transmit ACK/NACK feedback information of first data to the second device. The transmitter 630 is configured to, when the first indication information indicates that the device is required to transmit the ACK/NACK feedback information of the first data to the second device, transmit the ACK/NACK feedback information of the first data to the second device.

As an alternative embodiment, the receiver 610 is specifically configured to receive the first indication information carried in a message encapsulated with the first data or scheduling information of the first data from the second device.

As an alternative embodiment, the receiver 610 is further specifically configured to receive the first indication information carried in a message encapsulated with second data or scheduling information of the second data from the second device.

As an alternative embodiment, the first data is N pieces of data received before or after the device 600 receives the first indication information, N being more than or equal to 1.

Or, the first data is at least one piece of data received after the device 600 transmits the ACK/NACK feedback information last time.

Or, the first data is at least one piece of data received after the device 600 receives feedback indication information last time, the feedback indication information indicating that the device 300 is required to transmit ACK/NACK feedback information of third data to the second device.

As an alternative embodiment, the processor 620 is configured to, before the ACK/NACK feedback information of the first data is transmitted to the second data, determine a resource for transmitting the ACK/NACK feedback information according to a resource occupied by the second data or the scheduling information of the second data. The transmitter 630 is specifically configured to transmit the ACK/NACK feedback information of the first data to the second device on the resource for the ACK/NACK feedback information.

As an alternative embodiment, the first indication information further includes information of the resource for transmitting the ACK/NACK feedback information of the first data. The processor 620 is further configured to determine the resource for transmitting the ACK/NACK feedback information according to the information of the resource for transmitting the ACK/NACK feedback information of the first data. The transmitter 630 is further specifically configured to transmit the ACK/NACK feedback information to the second device on the resource for the ACK/NACK feedback information.

As an alternative embodiment, the first indication information includes HARQ timing information and the HARQ timing information indicates time interval information between a time when the device receives the first indication information and a time when the device transmits the ACK/NACK feedback information. The transmitter 630 is further specifically configured to transmit the ACK/NACK feedback information of the first data to the second device according to the HARQ timing information.

As an alternative embodiment, the transmitter 630 is specifically configured to, if the device correctly decodes all data blocks in the first data, transmit ACK information of the first data to the second device and, if the device incorrectly decodes at least one data block in the first data, transmit NACK information of the first data to the second device.

It is to be understood that the device 600 may specifically be the first device in the abovementioned embodiments and may be configured to execute each step and/or flow corresponding to the first device in the abovementioned method embodiments. Alternatively, the memory 640 may include a Read-Only Memory (ROM) and a Random Access Memory (RAM) and provides an instruction and data for the processor. A part of the memory may further include a nonvolatile RAM. For example, the memory may further store information of a device type. The processor 620 may be configured to execute the instruction stored in the memory, and when the processor executes the instruction, the processor may execute each step corresponding to the first device in the abovementioned method embodiments.

Figure 7:
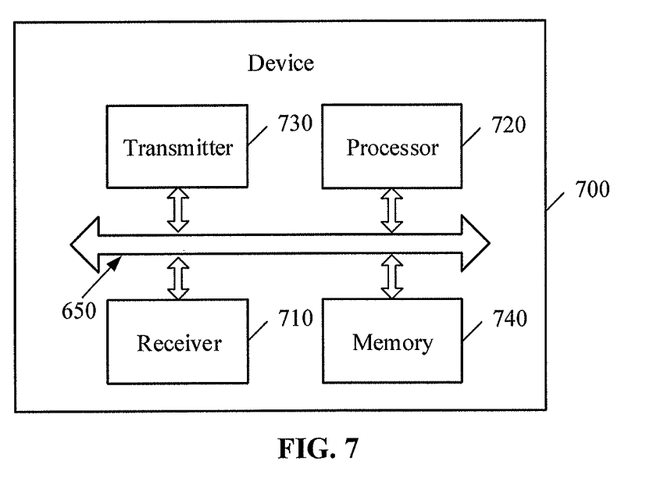
FIG. 7 illustrates another schematic block diagram of a device for data transmission according to an embodiment of the application.

FIG. 7 illustrates a device for data transmission 700 according to an embodiment of the application. The device 700 includes a receiver 710, a processor 720, a transmitter 730, a memory 740 and a bus system 750. The receiver 710, the processor 720, the transmitter 730 and the memory 740 are connected through the bus system 750. The memory 740 is configured to store an instruction. The processor 720 is configured to execute the instruction stored in the memory 740 to control the receiver 710 to receive a signal and control the transmitter 730 to transmit an instruction.

The transmitter 730 is configured to transmit first indication information to a first device, the first indication information indicating whether the first device is required to transmit ACK/NACK feedback information of first data to the device.

The receiver 710 is configured to, when the first indication information indicates that the first device is required to transmit the ACK/NACK feedback information of the first data to the device, receive the ACK/NACK feedback information of the first data from the first device.

As an alternative embodiment, the transmitter 730 is specifically configured to transmit the first indication information to the first device through a message encapsulated with the first data or scheduling information of the first data.

As an alternative embodiment, the transmitter 730 is further specifically configured to transmit the first indication information to the first device through a message encapsulated with second data or scheduling information of the second data.

As an alternative embodiment, the first data is N pieces of data transmitted before or after the device 400 transmits the second data, N being more than or equal to 1.

Or, the first data is at least one piece of data transmitted after the device 700 receives the ACK/NACK feedback information last time.

Or, the first data is at least one piece of data transmitted after the device 700 transmits feedback indication information last time, the feedback indication information indicating that the first device is required to transmit ACK/NACK feedback information of third data to the device 700.

As an alternative embodiment, the receiver 710 is specifically configured to receive the ACK/NACK feedback information of the first data from the first device on a resource for transmitting the ACK/NACK feedback information, the resource for transmitting the ACK/NACK feedback information being determined according to a resource occupied by the second data or the scheduling information of the second data.

As an alternative embodiment, the first indication information further includes information of the resource for transmitting the ACK/NACK feedback information of the first data. The receiver 710 is further specifically configured to receive the ACK/NACK feedback information of the first data from the first device according to the information of the resource for transmitting the ACK/NACK feedback information of the first data.

As an alternative embodiment, the first indication information includes HARQ timing information and the HARQ timing information indicates time interval information between a time when the first device receives the first indication information and a time when the first device transmits the ACK/NACK feedback information. The receiver 710 is further specifically configured to receive the ACK/NACK feedback information of the first data from the first device according to the HARQ timing information.

As an alternative embodiment, the receiver 710 is further specifically configured to, if the first device correctly decodes all data blocks in the first data, receive, by the device 700, ACK information of the first data from the first device and, if the first device incorrectly decodes at least one data block in the first data, receive, by the device, NACK information of the first data from the first device.

It is to be understood that the device 700 may specifically be the second device in the abovementioned embodiments and may be configured to execute each step and/or flow corresponding to the second device in the abovementioned method embodiments. Alternatively, the memory 740 may include a ROM and a RAM and provides an instruction and data for the processor. A part of the memory may further include a nonvolatile RAM. For example, the memory may further store information of a device type. The processor 720 may be configured to execute the instruction stored in the memory, and when the processor executes the instruction, the processor may execute each step corresponding to the second device in the abovementioned method embodiments.

It is to be understood that, in the embodiments of the application, the processor 620 and the processor 720 may be Central Processing Units (CPUs) and the processor may also be another universal processor, a Digital Signal Processor (DSP), an ASIC, a Field-Programmable Gate Array (FPGA) or another programmable logic device, discrete gate or transistor logic device and discrete hardware component and the like. The universal processor may be a microprocessor or the processor may also be any conventional processor and the like.

It should be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It should be understood that, in various embodiments of the application, a magnitude of a sequence number of each process does not mean an execution sequence and the execution sequence of each process should be determined by its function and an internal logic and should not form any limit to an implementation process of the embodiments of the application.

Those of ordinary skill in the art may realize that the units and algorithm actions of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the actions of the method in each embodiment of the application. The abovementioned storage medium includes: various media capable of storing program codes such as a U disk, a mobile hard disk, a ROM, a RAM, a magnetic disk or an optical disk.

The above is only the specific implementation of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method for data transmission, comprising:
 receiving, by a first device, first data from a second device;
 receiving, by the first device, first indication information carried in scheduling information of the first data from the second device, the first indication information indicating whether the first device is required to transmit Acknowledge/Non-acknowledge (ACK/NACK) feedback information of the first data to the second device, wherein the first data comprises at least one piece of data received after the first device transmits the ACK/NACK feedback information last time and before the first device receives the first indication information; and
 based on a determination that the first indication information indicates that the first device is required to transmit the ACK/NACK feedback information of the first data to the second device and the first indication information comprises a Hybrid Automatic Repeat Request (HARQ) timing information, transmitting, by the first device, the ACK/NACK feedback information of the first data to the second device according to the HARQ timing information, wherein the HARQ timing information indicates time interval information between a time when the first device receives the first indication information and a time when the first device transmits the ACK/NACK feedback information of the first data.

2. The method of claim 1, wherein the first data comprises N pieces of data received before the first device receives the first indication information, N being more than or equal to 2, or
 the first data is at least one piece of data received after the first device receives feedback indication information last time, the feedback indication information indicating that the first device is required to transmit ACK/NACK feedback information of third data to the second device.

3. The method of claim 1, before transmitting, by the first device, the ACK/NACK feedback information of the first data to the second device, further comprising:
 determining, by the first device, a resource for transmitting the ACK/NACK feedback information according to a resource occupied by the second data or the scheduling information of the second data,
 wherein transmitting, by the first device, the ACK/NACK feedback information of the first data to the second device comprises:
 transmitting, by the first device, the ACK/NACK feedback information of the first data to the second device on the resource for the ACK/NACK feedback information.

4. The method of claim 1, wherein the first indication information further comprises information of a resource for transmitting the ACK/NACK feedback information of the first data, and
 wherein transmitting, by the first device, the ACK/NACK feedback information of the first data to the second device comprises:
 determining, by the first device, the resource for transmitting the ACK/NACK feedback information according to the information of the resource for transmitting the ACK/NACK feedback information of the first data; and
 transmitting, by the first device, the ACK/NACK feedback information to the second device on the resource for the ACK/NACK feedback information.

5. The method of claim 1, wherein transmitting, by the first device, the ACK/NACK feedback information of the first data to the second device comprises:
 when the first device correctly decodes all data blocks in the first data, transmitting, by the first device, ACK information of the first data to the second device; or
 when the first device incorrectly decodes at least one data block in the first data, transmitting, by the first device, NACK information of the first data to the second device.

6. The method of claim 1, wherein a message for carrying the first data is different from the scheduling information carrying the first indication information.

7. A method for data transmission, comprising:
 transmitting, by a second device, first data to a first device;
 transmitting, by the second device, first indication information to the first device through scheduling information of the first data, the first indication information indicating whether the first device is required to transmit Acknowledge/Non-acknowledge (ACK/NACK) feedback information of the first data to the second device, wherein the first data comprises at least one piece of data received after the first device transmits the ACK/NACK feedback information last time and before the first device receives the first indication information; and
 based on a determination that the first indication information indicates that the first device is required to transmit the ACK/NACK feedback information of the first data to the second device and the first indication information further comprises information of the resource for transmitting the ACK/NACK feedback information of the first data, receiving, by the second device, the ACK/NACK feedback information of the first data from the first device according to the information of the resource for the ACK/NACK feedback information of the first data, wherein the HARQ timing information indicates time interval information between a time when the first device receives the first indication information and a time when the first device transmits the ACK/NACK feedback information of the first data.

8. The method of claim 7, wherein the first data comprises N pieces of data transmitted before the second device transmits the first indication information, N being more than or equal to 2, or
 the first data is at least one piece of data transmitted after the second device transmits feedback indication information last time, the feedback indication information indicating that the first device is required to transmit ACK/NACK feedback information of third data to the second device.

9. The method of claim 7, wherein receiving, by the second device, the ACK/NACK feedback information of the first data from the first device comprises:
 receiving, by the second device, the ACK/NACK feedback information of the first data from the first device on a resource for transmitting the ACK/NACK feedback information, the resource for transmitting the ACK/NACK feedback information being determined according to a resource occupied by the second data or the scheduling information of the second data.

10. The method of claim 7, wherein the first indication information further comprises information of the resource for transmitting the ACK/NACK feedback information of the first data, and wherein receiving, by the second device, the ACK/NACK feedback information of the first data from the first device comprises:

receiving, by the second device, the ACK/NACK feedback information of the first data from the first device according to the information of the resource for the ACK/NACK feedback information of the first data.

11. The method of claim 7, wherein receiving, by the second device, the ACK/NACK feedback information of the first data from the first device comprises:

when the first device correctly decodes all data blocks in the first data, receiving, by the second device, ACK information of the first data from the first device; and when the first device incorrectly decodes at least one data block in the first data, receiving, by the second device, NACK information of the first data from the first device.

12. The method of claim 7, wherein a message for carrying the first data is different from the scheduling information carrying the first indication information.

13. A device for data transmission, comprising:

a processor; and a memory storing instructions, which, when executed by the processor, cause the processor to perform one or more actions comprising:

receiving first data from a second device;

receiving first indication information carried in scheduling information of the first data from the second device, the first indication information indicating whether the device is required to transmit Acknowledge/Non-acknowledge (ACK/NACK) feedback information of the first data to the second device, wherein the first data comprises at least one piece of data received after the first device transmits the ACK/NACK feedback information last time and before the first device receives the first indication information; and based on a determination that the first indication information indicates that the device is required to transmit the ACK/NACK feedback information of the first data to the second device and the first indication information comprises a Hybrid Automatic Repeat Request (HARQ) timing information, transmitting the ACK/NACK feedback information of the first data to the second device according to the HARQ timing information, wherein the HARQ timing information indicates time interval information between a time when the first device receives the first indication information and a time when the first device transmits the ACK/NACK feedback information of the first data.

14. The device of claim 13, wherein the first data comprises N pieces of data received before the device receives the first indication information, N being more than or equal to 2, or the first data is at least one piece of data received after the device receives feedback indication information last time, the feedback indication information indicating the device is required to transmit ACK/NACK feedback information of third data to the second device.

15. The device of claim 13, wherein the one or more actions further comprise:

before the ACK/NACK feedback information of the first data is transmitted to the second device, determining a resource for transmitting the ACK/NACK feedback information according to a resource occupied by the second data or the scheduling information of the second data, wherein transmitting the ACK/NACK feedback information of the first data to the second device comprises: transmitting the ACK/NACK feedback information of the first data to the second device on the resource for the ACK/NACK feedback information.

16. The device of claim 13, wherein the first indication information further comprises information of the resource for transmitting the ACK/NACK feedback information of the first data, wherein transmitting the ACK/NACK feedback information of the first data to the second device comprises:

determining the resource for transmitting the ACK/NACK feedback information according to the information of the resource for transmitting the ACK/NACK feedback information of the first data; and transmitting the ACK/NACK feedback information to the second device on the resource for the ACK/NACK feedback information.

17. The device of claim 13, wherein a message for carrying the first data is different from the scheduling information carrying the first indication information.

* * * * *